US009841133B2

(12) United States Patent
Quinn et al.

(10) Patent No.: US 9,841,133 B2
(45) Date of Patent: Dec. 12, 2017

(54) RIGID REPAIR WRAP

(71) Applicants: Christopher Quinn, Orem, UT (US); Reed Quinn, Orem, UT (US); Kit Morrison, Orem, UT (US); Matthew Hawkes, Orem, UT (US)

(72) Inventors: Christopher Quinn, Orem, UT (US); Reed Quinn, Orem, UT (US); Kit Morrison, Orem, UT (US); Matthew Hawkes, Orem, UT (US)

( * ) Notice: Subject to any disclaimer, the term of this patent is extended or adjusted under 35 U.S.C. 154(b) by 417 days.

(21) Appl. No.: 13/970,228

(22) Filed: Aug. 19, 2013

(65) Prior Publication Data
US 2015/0050856 A1 Feb. 19, 2015

(51) Int. Cl.
F16L 55/18 (2006.01)
D06M 15/564 (2006.01)
D06M 15/55 (2006.01)
F16L 55/168 (2006.01)

(52) U.S. Cl.
CPC ......... F16L 55/1686 (2013.01); D06M 15/55 (2013.01); D06M 15/564 (2013.01); Y10T 442/2746 (2015.04)

(58) Field of Classification Search
CPC . F16L 55/168; F16L 55/1683; F16L 55/1686; D06M 15/564; D06M 15/55; Y10T 442/2746
USPC .................................... 442/59–180, 304–309
See application file for complete search history.

(56) References Cited

U.S. PATENT DOCUMENTS

| 2,924,546 | A | | 2/1960 | Shaw | |
|---|---|---|---|---|---|
| 4,668,563 | A | * | 5/1987 | Buese et al. | 442/314 |
| 4,756,337 | A | | 7/1988 | Settineri | |
| 4,892,780 | A | | 1/1990 | Cochran et al. | |
| 5,030,493 | A | * | 7/1991 | Rich | 428/63 |
| 5,256,134 | A | * | 10/1993 | Ingham | 602/8 |
| 5,348,801 | A | | 9/1994 | Venzi et al. | |
| 5,445,874 | A | * | 8/1995 | Shehata | 442/287 |
| 5,540,652 | A | * | 7/1996 | Callinan et al. | 602/1 |
| 5,658,650 | A | * | 8/1997 | Neamy et al. | 442/164 |
| 5,732,743 | A | | 3/1998 | Livesay | |
| 5,786,408 | A | | 7/1998 | Kuroda et al. | |
| 6,543,487 | B2 | | 4/2003 | Bazinet | |
| 7,938,136 | B1 | * | 5/2011 | Walker | 137/15.09 |
| 2004/0129373 | A1 | | 7/2004 | Nadarajah et al. | |
| 2006/0137756 | A1 | | 6/2006 | Rice | |

(Continued)

FOREIGN PATENT DOCUMENTS

| EP | 0531055 | | 8/1992 |
|---|---|---|---|
| WO | 2009049383 | | 4/2009 |
| WO | WO 2011065813 A1 | * | 6/2011 |

OTHER PUBLICATIONS

FiberFix.com, archived Aug. 18, 2013.*

(Continued)

Primary Examiner — Frank Vineis
(74) Attorney, Agent, or Firm — Dodd Call Black, PLLC; Dustin L. Call

(57) ABSTRACT

A repair wrap for repairing or strengthening an inanimate object. The repair wrap includes a fabric, where the fabric includes one or more fibers. The repair wrap also includes a hardening material. The fabric is configured to be wrapped around a portion of an inanimate object. Curing the hardening material is configured to form a shell about the portion of the inanimate object.

2 Claims, 7 Drawing Sheets

(56) References Cited

U.S. PATENT DOCUMENTS

| | | |
|---|---|---|
| 2006/0272724 A1 | 12/2006 | Borland et al. |
| 2007/0125437 A1 | 6/2007 | Lazzara |
| 2008/0017263 A1* | 1/2008 | Robinson et al. ............... 138/99 |
| 2008/0216938 A1 | 9/2008 | Rice |
| 2010/0147409 A1 | 6/2010 | Lu et al. |
| 2010/0154913 A1 | 6/2010 | Brooks et al. |
| 2011/0203694 A1 | 8/2011 | Brooks |
| 2011/0229698 A1 | 9/2011 | Rasmussen et al. |
| 2012/0245284 A1* | 9/2012 | Leong et al. ................. 524/714 |

OTHER PUBLICATIONS

Res-Q Composite Wrap, T.D. Williamson, Inc, Mar. 2009.*

Nguyen, T, Checking the Claim: FiberFix is 100 Times Stronger Than Duct Tape, Smithsonian.com, <http://blogs.smithsonianmag.com/ideas/2013/11/checking-the-claim-fiberfix-is-100-times-strongerthan- duct-tape>, Nov. 6, 2013.*

Pipe Materials, archived Sep. 19, 2004, <http://water.me.vccs.edu/concepts/material.html>.*

Merriam Webster, Waterproof, http://www.merriam-webster.com/dictionary/waterproof, accessed Aug. 3, 2015.*

Merriam Webster, Watertight, http://www.merriam-webster.com/dictionary/watertight, accessed Aug. 3, 2015.*

International Search Report and Written Opinion of the International Searching Authority (for PCT application No. PCTIB2014063600 which has claims that have some elements which are similar to the current application).

International Search Report and Written Opinion of the International Searching Authority (for PCT application No. PCTIB2014063601 which has claims that have some elements which are similar to the current application).

International Search Report and Written Opinion of the International Searching Authority (for PCT application No. PCTIB2014063602 which has claims that have some elements which are similar to the current application).

International Search Report and Written Opinion of the International Searching Authority (for PCT application No. PCTIB2014063603 which has claims that have some elements which are similar to the current application).

International Search Report and Written Opinion of the International Searching Authority (for PCT application No. PCTIB2014063604 which has claims that have some elements which are similar to the current application).

* cited by examiner

RIGID REPAIR WRAP

CROSS-REFERENCE TO RELATED APPLICATIONS

This application is related to co-pending U.S. patent application Ser. No. 13/970,230, filed on Aug. 19, 2013, and entitled, "ATTACHMENT METHOD FOR SECURING ELEMENTS TO ONE ANOTHER USING REPAIR WRAP", which application is incorporated herein by reference in its entirety.

This application is related to co-pending U.S. patent application Ser. No. 13/970,238, filed on Aug. 19, 2013, and entitled, "REPAIR KIT FOR SECURING ELEMENTS TO ONE ANOTHER USING REPAIR WRAP", which application is incorporated herein by reference in its entirety.

BACKGROUND OF THE INVENTION

When faced with the problem of a broken item, such as the handle of a gardening tool for example, a user generally has the choice of attempting to repair the item, or discarding the item and purchasing a replacement. Neither approach is particularly satisfactory.

For example, if the user should choose to replace the item, the user will incur the expense of the item and possibly other expenses, such as shipping and taxes. In terms of intangibles, the user must spend time to locate and purchase the item, when that time might be profitably employed in other pursuits. In other instances, where the item may be relatively uncommon, it may be difficult or impossible to find a suitable replacement. In such an instance, the user may have to strike a compromise and attempt to find a substitute that may or may not be fully satisfactory for its intended use.

Rather than attempting to find a replacement for the broken item, the user may attempt to repair the item, and thereby avoid some of the difficulties noted above. However, depending upon the item to be repaired and the type of damage, some breaks or other damage may not lend themselves to a wide range of remedies. Thus, a user may attempt to affect a repair of a broken item with materials such as duct tape or electrician's tape; however, such materials can deteriorate relatively quickly due to exposure to conditions such as moisture, sunlight, and abrasion. Moreover, where repair of a relatively rigid item, such as a tool handle for example, is desired, flexible materials such as the aforementioned tapes may not provide for a particularly effective repair.

Accordingly, there is a need in the art for a repair material that can allow a user to repair rather than replace an item. In addition, there is a need in the art for a repair material that can provide a rigid structure during the repair. Moreover, there is a need in the art for a repair material which adheres directly to the object in need of repair.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a repair wrap for repairing or strengthening an inanimate object. The repair wrap includes a fabric, where the fabric includes one or more fibers. The repair wrap also includes a hardening material. The fabric is configured to be wrapped around a portion of an inanimate object. Curing the hardening material is configured to form a shell about the portion of the inanimate object.

Another example embodiment includes a repair wrap for repairing or strengthening an inanimate object. The repair wrap includes a fabric. The fabric includes one or more fibers and the one or more fibers are knit to form the fabric. The repair wrap also includes a resin disposed in the fabric. The resin is water activated and configured to cure in exposure to air. The fabric is configured to be wrapped around a portion of an inanimate object. Curing the hardening material is configured to form a shell about the portion of the inanimate object.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
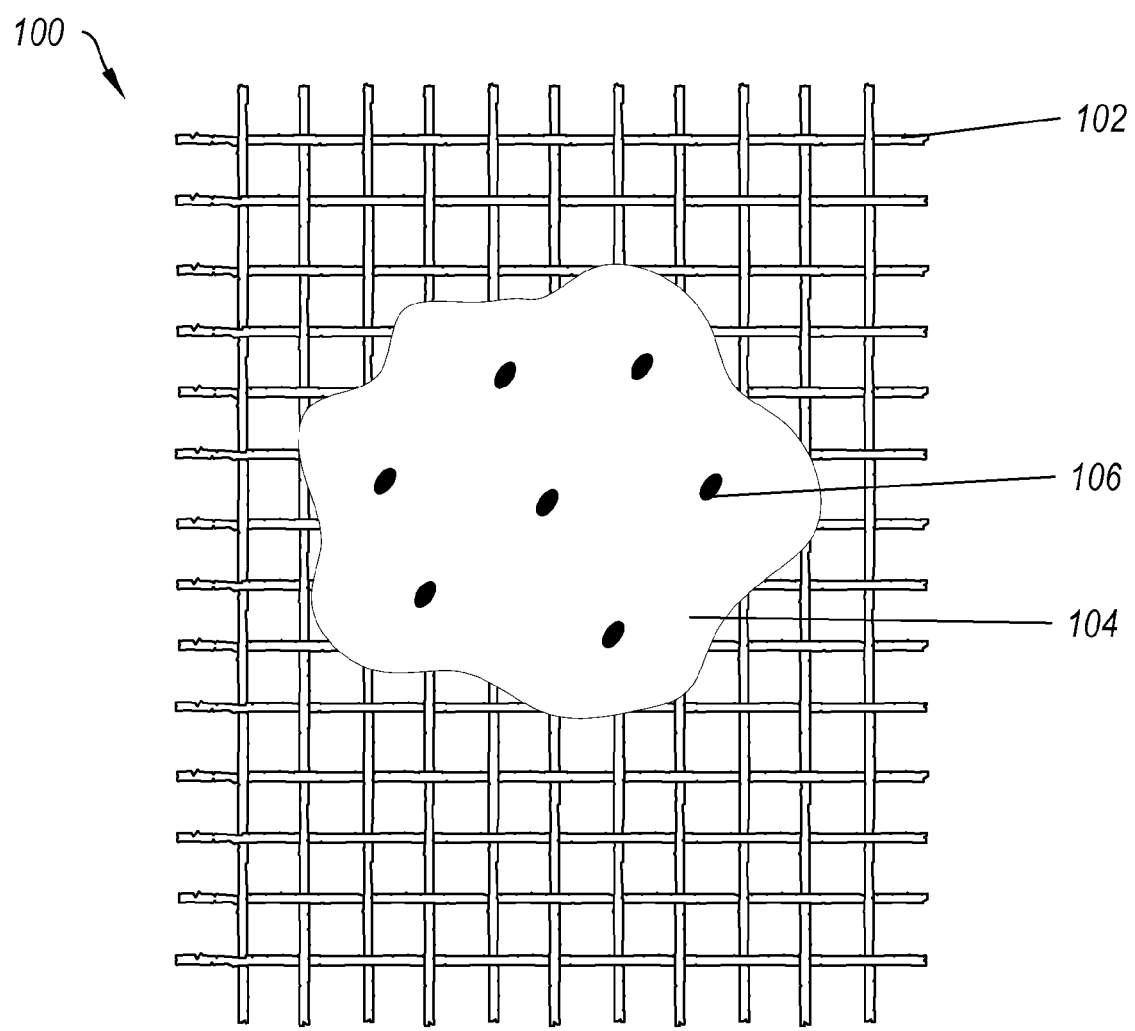
FIG. 1 illustrates an example of a repair wrap.

FIG. 1 illustrates an example of a repair wrap 100. The repair wrap 100 can be employed in a wide variety of applications. For example, the repair wrap 100 may be used to repair, temporarily or permanently, broken items. I.e., if an object has been broken, the two ends of the break can be positioned proximate to one another and the repair wrap 100 can be applied, securing the two ends of the break in their respective position. Additionally or alternatively, the repair wrap 100 may be used to join two or more elements together, even if the elements were not previously broken apart from each other, may be used to patch holes, may be used to strengthen an object or used for any other desired purpose.

In general, the repair wrap 100 may be employed to affect repairs of broken items that may be rigid, or relatively flexible. As used herein, the term 'repair' is intended to be broadly construed and includes, but is not limited to: the joining of two pieces of an item that have partially or completely broken apart from each other and/or the covering of a hole, crack or fracture in an item or restore or straighten a bent or folded item.

General areas of application include industry, home and garden, sporting goods, recreation, landscaping, automotive, military and agriculture. For example, the repair wrap 100 may be used in connection with a variety of different materials. Such materials include, but are not limited to, wood, metal, glass, plastic, rubber, composites, fiberglass, ceramic, concrete, and combinations of any of the foregoing. E.g., the repair wrap 100 may be used to repair, temporarily or permanently, items such as garden tool handles, ski poles, hiking poles, golf clubs, baseball and softball bats, fishing rods, piping, tubing, sprinkler piping, tent poles, hoses, carbon bike frame tubes, oars, paddles, posts, rails, luggage racks, and furniture. In addition to use in the repair, or joining, of elements of the aforementioned inanimate objects, various specialized applications of the repair wrap 100 are also possible.

For example, the repair wrap 100 may be employed in connection with living matter, such as to graft tree limbs, and to repair tree limbs that have been damaged or broken. In this example application, the repair wrap 100 may take the form of a biodegradable resin and/or fabric that is compatible with the tree limbs. The resin may have a green color, or earth tone color, to better blend with the natural colors of the tree or other plant. However, the repair wrap 100 would not be advantageous for use in humans or animals. In particular, the repair wrap 100 has a number of properties that make it unsuitable for use on humans or animals. For example, some of the differences include:

Properties of Casting Tape for Humans:
1. Applied on top of a loose and porous layer of gauze or other pre-wrap;
2. Should always be applied by a trained professional to avoid additional damage;
3. Porous so sweat can evaporate;
4. Removable so that it can be removed easily when the bone heals;
5. Low density so it does not prevent x-ray passing through it;
6. Comes in long rolls to wrap a whole arm or leg, allows customization;
7. Low adhesive properties because it is applied over gauze and does not need to stick to a wide variety of surfaces.

Properties of Rigid Repair Wrap 100:
1. Applied directly to the desired area without intervening layers;
2. Can be applied easily, without training;
3. Water tight depending on wrapping technique;
4. Permanently affixed, it is not meant to come off easily;
5. High density to create desired sealing properties and strength of the wrap;
6. Comes in a small roll to allow for wrapping things with a small diameter like pipes and tool handles and allow users to use without cutting; and
7. Strong adhesive so that it sticks to almost any surface.

One of skill in the art will appreciate that if you wanted to repair a bone with the disclosed repair wrap 100, you would have to apply it directly to the bone and then remove the repair wrap 100 via surgery after healing. Because external casting allows for the healing without surgery, it is unlikely that the disclosed rigid repair wrap 100 would produce better results.

FIG. 1 shows that the repair wrap 100 can include a fabric 102. The fabric 102 can include any fabric that provides the desired properties, which may vary depending on intended use. For example, the thickness of fabric 102 that provide the most beneficial properties are between 180 grams per square meter and 450 grams per square meter and it becomes ineffective with fabric contain containing less than 100 grams per square meter or more than 500 grams per square meter.

Additionally or alternatively, the fabric 100 may take a variety of shapes and configurations. For example, the fabric 100 may be in sheet form, or in strips of a desired length and width. Alternatively, the fabric 100 can be in the form of wrap, which may or may not be in a roll, of a desired width. As well, the thickness of the fabric 100 can be selected, as described above.

Further, the fabric 100 can include one or more fiber material, providing the desired characteristics. For example, the fabric 100 may include, non-woven fibers including felts and chop strand fabrics, woven fibers including twills plain weaves and roving weaves, knit fibers, or any other desired fibers and/or patterns. For example, the fabric 102 can include natural and/or synthetic fibers which may or may not be biodegradable. The fibers can be selected for one or more desirable properties. Such properties can include fire-resistance, water-resistance, mold-resistance, fungus-resistance, heat-resistance, tear-resistance, to name a few examples.

Fiberglass:
Fiberglass is extremely strong and inexpensive. It is easy to manufacture and there are many types of commercially available woven, non-woven and knit cloths. Fiberglass is brittle, it is very strong but when it breaks it shatters and the splinters can be sharp and dangerous. When you sand it the fibers can cause skin irritation. Fiberglass has low absorption properties (e.g., it would be difficult to clean up a pool of water with a fiberglass cloth). Any low viscosity material has to be forced into it under pressure and my not stay adhered will to the fibers even after saturation. This makes it more difficult to manufacture a pre-impregnated fabric 102. Fiberglass also has the characteristic that the fibers themselves are brittle and cannot be creased. If you crease the fibers they will break and the cloth will lose all of its strength. This also limits how tightly you can knit the fabric. If the loops are too tight and the cloth will be very weak because the fibers themselves will break when forced into a tight loop.

Carbon Fiber:
Carbon fiber is much stronger than glass fiber. But it is also much more expensive (8-10 times more expensive) than fiberglass. Like fiberglass it is brittle so it is hard to break but when it does it shatters and the splinters can be skin irritants. It does not sand well but it absorbs resin slightly better than fiberglass. Carbon fiber is more suitable for extreme applications like those used by the military or construction industry.

Aramids and Para-Aramid Synthetic Fibers:
The most famous of these fibers is Kevlar but there are other fibers such as Nomex, Technora and others. These fibers are stronger and less brittle than fiberglass but not as strong as carbon fiber. They are also more expensive than fiberglass (2-3 times) but still much less expensive than carbon fiber. These fabrics are less brittle than fiberglass or carbon fiber and so they result in softer and more flexible cloths. This produces a repair wrap 100 that has extremely high impact strengths. Aramids and para-aramid fibers can be used alone, in combination with one another, or combined with fiberglass and/or carbon fiber or in combination with other fibers.

Basalt:

Basalt is manufactured the same way as fiberglass. Rather than melting down and extruding glass Basalt fibers are extruded volcanic rock. Basalt is more expensive than fiberglass and has many of the same cons (it is brittle, cannot be creased, etc.). It is slightly stronger than fiberglass but its main strength when compared to fiberglass is that it is extremely heat and chemical resistant. For example, fabric 102 that includes basalt can be used in high temperature situations. For example, the repair wrap 100 that includes basalt can be used to repair a tail pipe on a car, or a pipe that was going to be exposed to open flames.

Polyester, Nylon and Other Plastic Fibers:

These fibers are extremely strong and inexpensive. Unlike most of the above fibers they do not irritate the skin if you sand them or break them. They can take a lot of vibration and impact because they are more flexible where the fibers above are more brittle. These fibers can take more total load per weight than fiberglass but they start to deform at lower weights. For example, one experiment was conducted with similar fabrics 102 comparing polyester and fiberglass. 1500 pounds of weight was placed on two pieces of metal pipe that were held together with repair wrap 100 where the fabric 102 was polyester and two pieces of identical pipe held together with repair wrap 100 where the fabric 102 was fiberglass. The fiberglass application stayed straight under the load and the polyester started to deform. However, at 2000 lbs. the fiberglass shattered the polyester did not. The polyester application bent like a V but it held the weight whereas the fiberglass did not.

Natural Fibers:

Natural fibers are a very broad category. These could be plant fibers like Hemp, Cotton or bamboo or animal fibers like Silk, wool, or even Spider Silk. Natural fibers tend to be expensive, and difficult to work with (because they are not uniformly manufactured). They can be just as strong as or even stronger than many of the synthetic fibers. The main advantage with natural fibers over all of the synthetic fibers above is that they are biodegradable. For example, if you used a natural fiber to repair a broken tree limb that snapped during a wind storm you would not want the fabric 102 to remain in place permanently or else the limb would not be able to continue to grow. Natural fibers would eventually degrade, such that the repair wrap 100 could be removed easily after the branch had healed or would naturally fall apart as the healed limb continued to grow.

FIG. 1 also shows that the repair wrap 100 can include a hardening material 104. The hardening material 104 is impregnated within the fabric 102. The hardening material 104 can include any compound which is configured to harden and secure the fabric 102 in place. I.e., the hardening material 104 will be cured and harden into a set configuration. The cured hardening material 104 and the fabric 102 will then provide the properties of the repair wrap 100, as discussed above.

The ratio of hardening material to fabric is critical to produce the desired properties. The ideal amount of hardening material 104 is the amount that just barely but completely saturates the cloth. For example, the ratio of hardening material 104 can be between 29 percent and 44 percent hardening material to fiber by weight. E.g., the ratio of hardening material 104 can be approximately 36.5% hardening material to fabric 102 by weight. The hardening material 104 may give off gas as it cures. The gas from the curing process forms tiny bubbles that can connect together and migrate during the curing process leaving channels for water to leak through, ruining the water tight seal. The more hardening material 104 the more gas is generated. Therefore, too much hardening material 104 will ruin the water tight property of the wrap. Likewise, too little hardening material 104 is just as problematic. Fibers within the fabric 102 are inherently porous. If there is too little hardening material 104 there will be dry places in the fibers and the repair will leak. Additionally dry places in the fabric will significantly reduce the strength and rigidity of the repair. As used in the specification and the claims, the term approximately shall mean that the value is within 10% of the stated value, unless otherwise specified.

The hardening material 104 can include any desired material. For example, the hardening material 104 can include resin or any other hardening material. Resin can include high bond strength epoxies, single stage as well as two part epoxies consisting of a resin and a hardener where the hardener is activated at some desired time. For example, the resin can include polyester resins both saturated and unsaturated. The resins can also be classified as a pre-mixed two part epoxy where one part is a moisture activated hardener. Resins are often characterized by the isocyanates that they contain. E.g., the resin can include MDI (methylene diphenyl diisocyanate) which has the lowest toxicity of the commonly available isocyanates. Resins containing other common isocyanates like TDI, HDI or IPDI may also be used.

FIG. 1 further shows that the repair wrap 100 can include an additive 106. For example, the additive 106 can include plastic, rubber, sand, wood particles, sawdust, fibrous material, polyester fibrous material or any other desired additive. The additives may or may not be biodegradable. In addition, the additives can be substantially non-toxic, allowing them to be handled during application and to repair items where non-toxic resins would be desirable, for example in repairing pipes that will carry drinking water.

Figure 2:
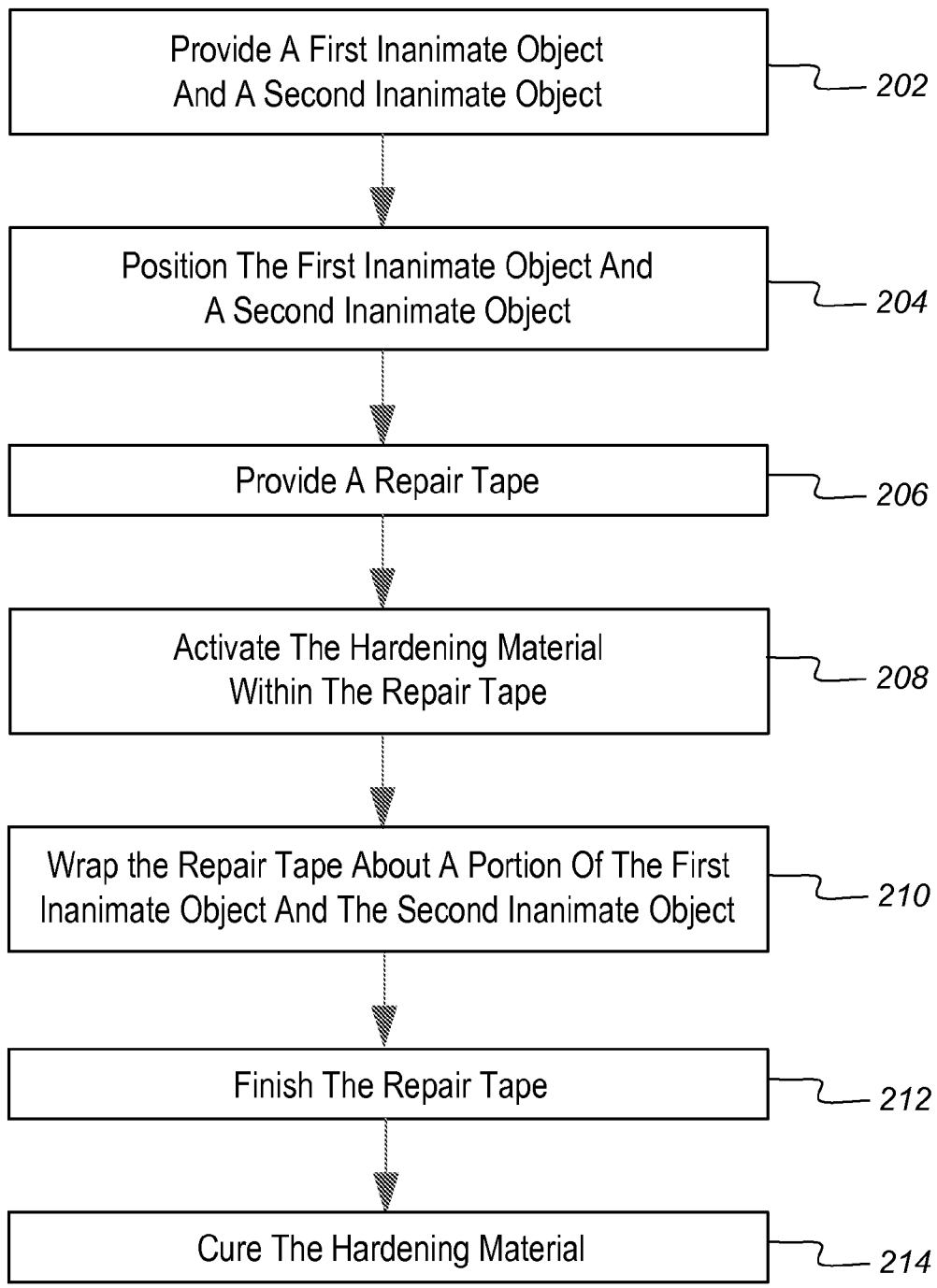
FIG. 2 is a flowchart illustrating a method of using a casting material for repairing, joining, securing or strengthening items.

FIG. 2 is a flowchart illustrating a method 200 of using a repair wrap for repairing, joining, securing or strengthening items. In at least one implementation, the repair wrap can be any desired repair wrap, such as the repair wrap 100 of FIG. 1. Therefore, the method 200 will be described, exemplarily, with reference to the repair wrap 100 of FIG. 1. Nevertheless, one of skill in the art will appreciate that the method 200 can be used with repair wrap other than the repair wrap 100 of FIG. 1.

FIG. 2 shows that the method 200 can include providing 202 a first inanimate object and a second inanimate object. The first inanimate object and the second inanimate object can include any materials that the user seeks to repair, secure, strengthen or otherwise repair. For example, the first inanimate object and the second inanimate object can include an item that has broken, or partially broken. One of skill in the art will appreciate that, although two inanimate objects are discussed herein, the number of inanimate objects is exemplary and can include one, two, three or more inanimate objects.

FIG. 2 also shows that the method 200 can include positioning 204 the first inanimate object and the second inanimate objects. For example, the first inanimate object and the second inanimate object can be positioned 204 proximate to each other in the position in which the first inanimate object and the second inanimate object will be secured to one another. For example, if the first inanimate object and the second inanimate object are a single broken object, the broken ends can be placed proximate one another.

FIG. 2 further shows that the method 200 can include providing 206 a repair wrap. The repair wrap can include a fabric with an impregnated hardening material and can additionally include additives within the hardening material if so desired.

FIG. 2 additionally shows that the method 200 can include activating 208 the hardening material within the repair wrap. Activating 208 can be accomplished, for example, by exposing the hardening material to a curing agent such as light, water, heat, air, or a combination of any of the foregoing. For example, the hardening material may be immersed in, or otherwise exposed to, water that is in a temperature range of about 68 degrees F. to about 77 degrees F., although other temperatures and ranges can be employed. If required, excess activating agent can be removed from the repair wrap. For example, the excess activating agent can be removed by compressing the repair wrap, by exposing the repair wrap to air or by hanging the repair wrap.

FIG. 2 moreover shows that the method 200 can include wrapping 210 the repair wrap about a portion of the first inanimate object and a portion of the second inanimate object. I.e., the repair wrap can be wrapped 210 around the portion of the first inanimate object and the portion of the second inanimate object that are proximate one another such that the portion of the first inanimate object and the portion of the second inanimate object that are proximate one another are secured to one another. The repair wrap can be wrapped 210 directly on the surface of the portion of the first inanimate object and the second inanimate object. I.e., unlike casting tape for use with humans which is applied loosely over gauze or pre-wrap and functions like a splint, repair wrap is applied it directly to the surface of the first inanimate object and the second inanimate object. This method of repair enables types of repairs that are not possible using traditional tapes or other solutions. The wrapping technique depends on the type of repair.

For example, for high impact repairs you only need a few layers over the break and as much as possible on either side of the break to maximize the surface area. E.g., for high impact strength the repair wrap may be wrapped around the portion of the first inanimate object and the portion of the second inanimate object that are proximate one another so that each strip overlaps the previous strip by about 30 percent to about 40 percent of the width of the strip and repeating to create approximately three layers. Examples of high impact are things like hammers or axes or other tools that must withstand the load and vibrational force associated with repeated impacts and rebound.

For leak sealing repairs a different wrapping 210 pattern may be desired. For example, the surface area is not as critical. Instead, the number of layers over the leak can be adjusted to create a more water tight seal. E.g., 8-10 layers of repair wrap over the leak provide a more water tight seal. High load strength repairs require an intermediate approach. For example, the wrap needs to have 6-8 layers over the break but also 4-6 inches on either side of the break. As indicated above, the repair wrap can be placed directly on the first inanimate object and the second inanimate object. High load applications are things like shovels, pruning shears and other tools that use leverage as well as long skinny things like tent poles, fishing poles ski poles etc. that hold a relatively large amount of weight or tension for their size.

FIG. 2 also shows that the method 200 can include finishing 212 the repair wrap. For example, the repair wrap may be smoothed and more evenly distributed by rubbing the hardening material. This may be performed by hand or with a tool such as drywall knife. Additionally or alternatively, a material can be placed around the repair wrap to both compress and provide a desired texture on the outer surface, as described below.

FIG. 2 also shows that the method 200 can include curing 214 the hardening material. I.e., once the hardening material has been satisfactorily distributed and smoothed, it can then be allowed to harden. One of skill in the art will appreciate that the curing 214 time is extremely sensitive to temperature. The higher the temperature the shorter the curing 214 time, the lower the temperature the longer the curing 214 time. In addition, for some hardening materials, there are two curing 214 times, one for the initial cure when the hardening material is no longer a liquid or no longer workable. The final cure is when the hardening material has reached its peak strength. The final cure time is roughly four times as long as the initial cure.

When the hardening material has cured 214 repair wrap may form a relatively hard shell disposed about the joint between the two pieces to be joined together (or disposed over a hole to be patched or form a shell over the piece to be strengthened depending on how the repair wrap is being used). This hard shell can then be further finished 212 if desired, although such processing is not necessary. Such processing may include one or more of sanding, cutting, buffing, smoothing, shaping, forming, texturing, painting, sealing, compressing or priming.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3A:
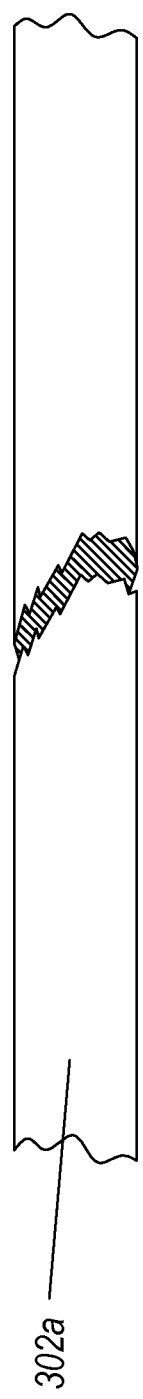
FIG. 3A illustrates a broken inanimate object on which a repair wrap can be used.
Figure 3B:
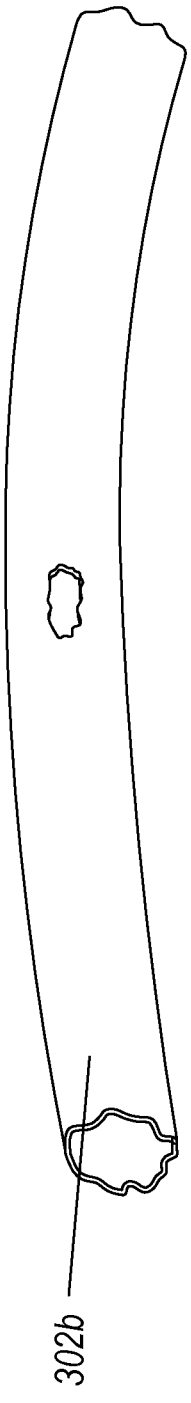
FIG. 3B illustrates an inanimate object with a hole on which a repair wrap can be used.

FIGS. 3A and 3B illustrate inanimate objects 302a and 302b, respectively, on which a repair wrap can be used. FIG. 3A illustrates a broken inanimate object 302a on which a repair wrap can be used; and FIG. 3B illustrates an inanimate object 302b with a hole on which a repair wrap can be used. The repair wrap may be used in the repair of an item that has been broken, or in the attachment of one element to another, and the hardening material itself may be curable such that upon exposure of the hardening material to a curing agent such as light, heat, water and/or air for example, the hardening material will harden.

The repair wrap can be substantially watertight on the inanimate objects 302a and 302b. For example, if inanimate object 302b is a water pipe or hose, for example, then the repair wrap needs to prevent water leakage to affect a repair of the inanimate object 302b. The key to water tightness includes two key aspects.

The Ability of the Hardening Material to Plug the Holes in the Fabric.

This is easier if the holes in the fabric (gaps between the fibers) are small and uniform. In addition, it is better to have lots of little holes than fewer big holes. The hardening material must also have a high enough viscosity to cling to un-absorptive fibers, such as fiberglass; otherwise it will flow with gravity leaving dry fibers exposed in parts of the wrap.

The Ratio of Hardening Material to Fabric.

For example, the ratio of hardening material to fabric can be 36.5% by weight, as described above. This allows the fabric to support and strengthen the hardening material and the hardening material to provide additional strength and form a water tight shell. One problem that occurs with too much hardening material is that the hardening material may give off gas as it cures. The gas from the curing process forms tiny bubbles that can connect together and migrate during the curing process leaving channels for water to leak through, ruining the water tight seal. The more hardening material the more gas is generated. So too much hardening material will ruin the water tight property of the wrap. Too little hardening material is just as problematic. The fibers are inherently porous. If there is too little hardening material there will be dry places in the fibers and the repair will leak. The ideal amount of hardening material is the amount that just barely but completely saturates the cloth.

Figure 4:
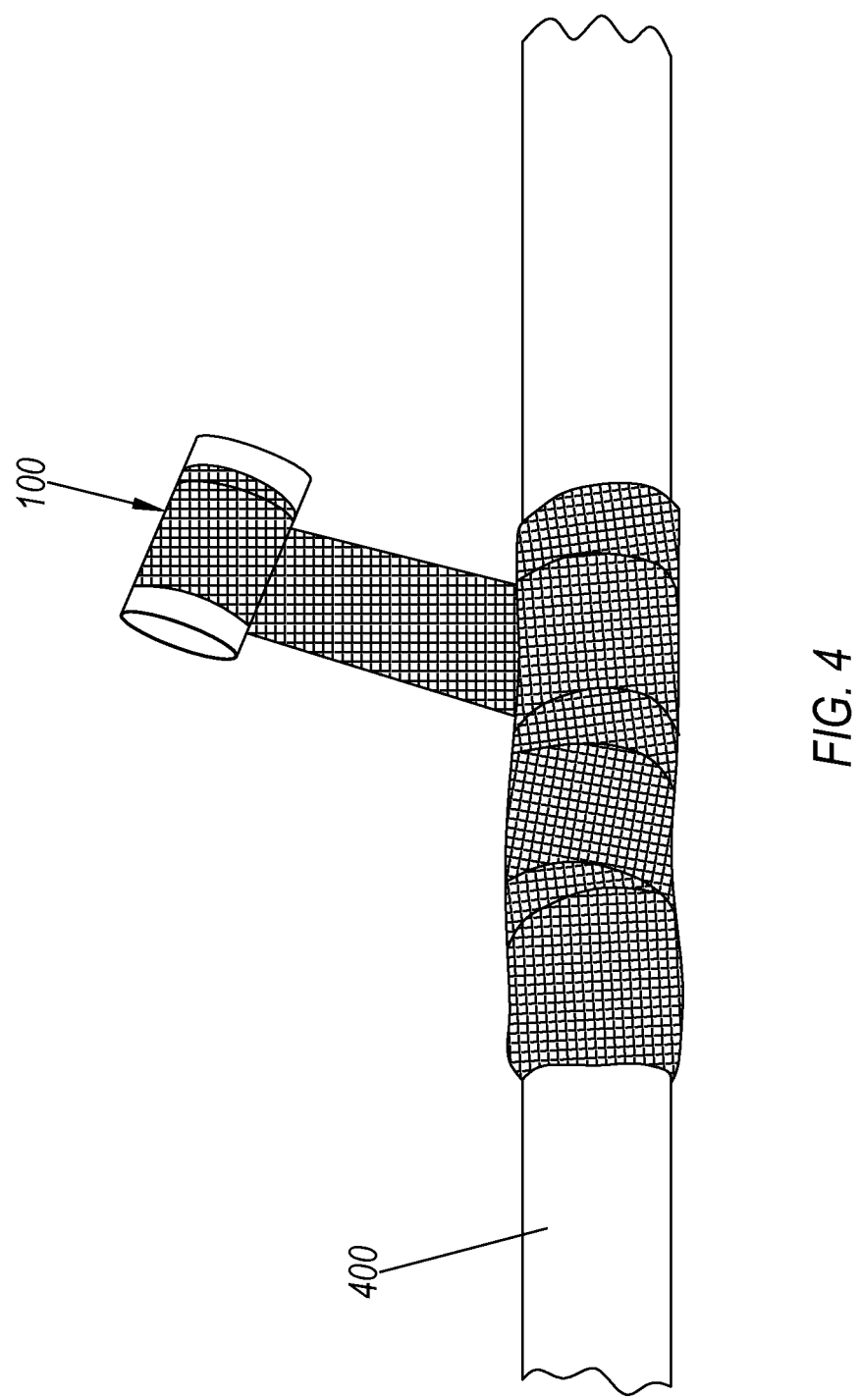
FIG. 4 illustrates an example of a repair wrap being applied to an inanimate object.

FIG. 4 illustrates an example of a repair wrap 100 being applied to an inanimate object 400. The repair wrap 100 can take the form of a roll so that the repair wrap 100 can be dispensed in a manner similar to that which would be used to dispense wrap from a roll of wrap.

FIG. 4 shows that the repair wrap 100 can be wrapped around the inanimate object 400. Different wrapping techniques can provide different results and/or benefits, as described above. Wrapping, however, provides multiple layers which can strengthen one another and/or increase the water tightness of the final product. One of skill in the art will appreciate that the repair wrap 100 can be applied directly to the inanimate object 400. I.e., unlike a casting material which is used to cast a broken bone in a human or animal, the repair wrap 100 need not have any intervening layers. Indeed, repair wrap 100 can be configured to attach directly to the inanimate object 400 after hardening, which provides strength and does not allow separate parts to be removed from the hardened shell.

Figure 5:
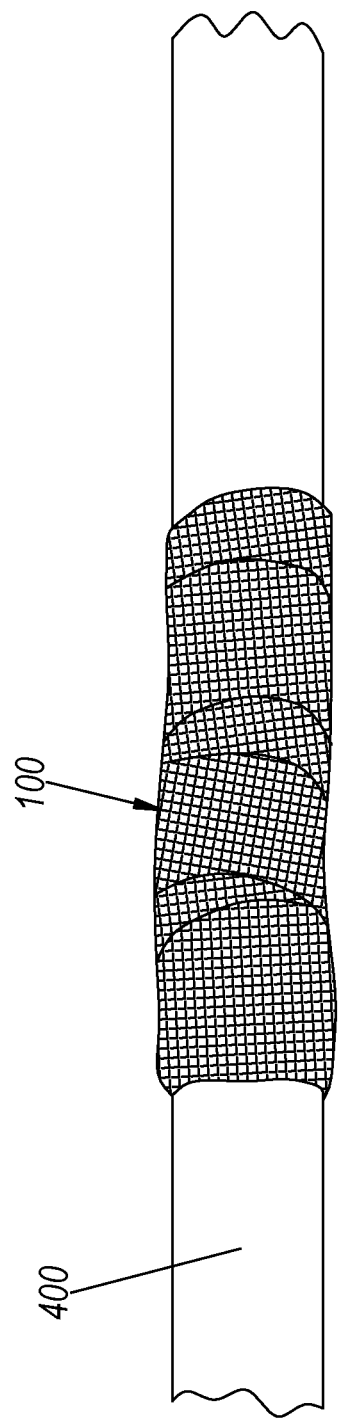
FIG. 5 illustrates an inanimate object with the repair wrap cured to form a hardened shell on inanimate object.

FIG. 5 illustrates an inanimate object 400 with the repair wrap 100 cured to form a hardened shell on inanimate object 400. The hardened shell can then be processed, as described above. Further, the hardened shell can secure the inanimate object 400 such that the inanimate object 400 is repaired and/or strengthened.

Figure 6:
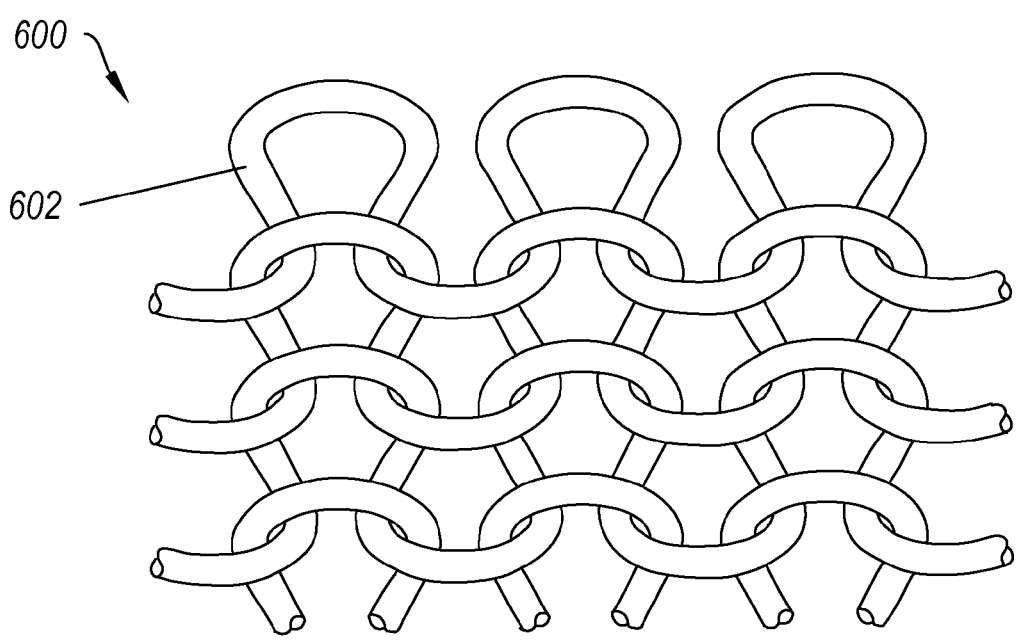
FIG. 6 illustrates an example of a knit fabric.

FIG. 6 illustrates an example of a knit fabric 600. A knit fabric includes a fabric formed by interlacing yarn or thread in a series of connected loops. I.e., a knit fabric 600 includes looped fibers. These loops tend to be fairly uniform in size, providing a repair wrap with a consistency that allows the hardening material to be embedded more easily than woven or felt fabrics.

Knit fabric 600 consists of a number of consecutive rows of loops, called stitches 602. As each row progresses, a new loop is pulled through an existing loop. The active stitches 602 are held on a curved, straight or inside a hollow needle until another loop can be passed through them. This process eventually results in a fabric. Knitting may be done by hand or by machine. There exist numerous styles and methods of both hand and machine knitting. Different types of yarns and needles may be used to achieve a plethora of knitted materials; these tools give the final piece a different color, texture, weight, and/or integrity. Other factors that affect the end result include the needle's shape, thickness and malleability, as well as the yarn's fiber type, texture and twist.

Alternatively, the fabric can include a weave (for example, as shown in FIG. 1). Weaving is the textile art in which a first set of fibers and a second set of fibers, called the warp and the filling or weft (older woof), respectively, are interlaced with each other to form a fabric or cloth. In particular, the first set of fibers can be held in place while the second set of fibers is woven through them or vice versa. The manner in which the first set of fibers and the second set of fibers interlace with each other is known as the weave. In particular, the weave can include plain weave, satin weave, and twill or any other type of weave.

In at least one implementation, plain weave can include the first set of fibers and second set of fibers aligned so they form a simple crisscross pattern. Each fiber in the second set of fibers crosses the first set of fibers by going over one, then under the next, and so on. The next fiber in the second set of fibers goes under the first set of fibers that its neighbor went over, and vice versa. The satin weave is characterized by four or more second set of fibers floating over a fiber 502 or vice versa, four or more first set of fibers floating over a single fiber in the second set of fibers. Twill is a type of fabric woven with a pattern of diagonal parallel ribs. It is made by passing the second set of fibers over one or more first set of fibers and then under two or more first set of fibers and so on, with a "step" or offset between rows to create the characteristic diagonal pattern.

Figure 7:
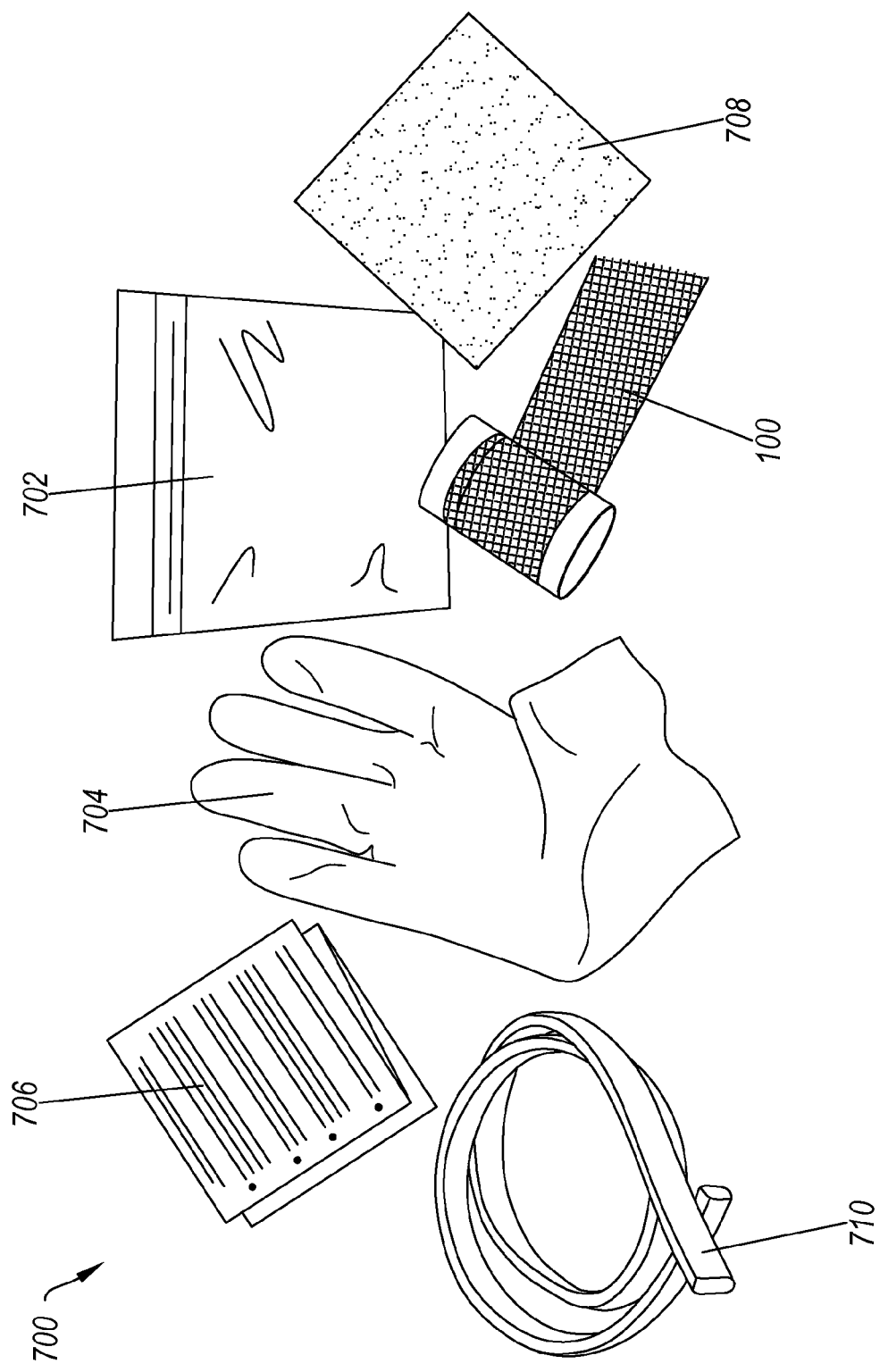
FIG. 7 illustrates an example of a repair kit.

FIG. 7 illustrates an example of a repair kit 700. The repair kit 700 can include all of the material required for a user to repair or strengthen an object. In particular, the repair kit 700 can allow a user to purchase, in a single transaction, all required elements to perform a repair and/or strengthen an inanimate object.

FIG. 7 shows that the repair kit 700 can include repair wrap 100. The repair wrap 100 can include a fabric and a hardening material. Because most resins must be used quickly after activation, the amount of repair wrap 100 in the repair kit 700 should be enough to complete a repair but no more or else there will be a lot of waste. Therefore, the repair wrap 100 may be a few general sizes. 1"×40" wraps is appropriate for repairs of skinny items like fishing poles, tent poles, ski poles, skinny pipes like 0.5 inch copper pipe or electrical conduit. 2"×50" is appropriate for things like 0.75 inch-1.5" sprinkler pipes, tooled handles, and garden hoses. 4"×60" is appropriate for larger items like fence posts and large 2", 3" and 4" pipes or things that are going to be under a lot of leverage like shovels, pruning shears, and snow shovels. In addition, the repair wrap 100 can include industrial size rolls that could be used on pipes of much larger diameter like those you would find in the oil and gas and mining industry. One of skill in the art will appreciate that the cure time must be adjusted for the length. If the length of the wrap is short it can be applied in a few minutes and the cure time at room temperature may be 3-5 minutes. For an industrial size roll that might be 6-10 meters it might take 5-10 minutes to apply the wrap and the cure time may be 15-20 minutes.

FIG. 7 also shows that the repair kit 700 can include a pouch 702. I.e., because the hardening material in the repair wrap 100 may be water activated it must be stored in an air tight pouch 702 or the moisture in the air will activate it. That also means that a user must use the entire product at one time. I.e., once he/she opens the pouch 702 he/she has a limited amount of time to apply the repair wrap 100 before it hardens.

FIG. 7 further shows that the repair kit 700 can include gloves 704. The gloves 704 can allow the user to handle the repair wrap 100 without getting the hardening material on his/her hands. Additionally or alternatively, the gloves 704 can prevent the user from contaminating the hardening material in the repair wrap 100. I.e., the hardening material can include chemicals that may otherwise irritate the user's skin, which can be prevented by the gloves 704.

FIG. 7 additionally shows that the repair kit 700 can include instructions 706. The instructions 706 can include information about the repair wrap 100 and how it can be best used to affect the desired repair. Additionally or alternatively, the instructions 706 can include information about where instructions can be found. I.e., the instructions 706 can include a website or other information that will tell a user where to find required information such as instructional videos.

FIG. 7 moreover shows that the repair kit 700 can include surface preparation materials 708. Surface preparation materials 708 can include sand paper or other abrasive material for cleaning and roughing up the surface, a cleaning towel or agent, and or a bonding agent to increase the adhesive properties. Additionally or alternatively, surface preparation materials 708 can include paint or other materials configured to change the appearance of the hardened repair wrap 100.

FIG. 7 also shows that the repair kit 700 can include a wrap 710. The wrap 710 can be configured to compress the wrap, removing the air bubbles increasing the density and thereby increasing the strength, and sealing properties. Additionally or alternatively, the wrap 710 can be configured to provide a smoother and more aesthetically pleasing finish to the wrap. For example, without the repair wrap will have a rough surface that will require sanding to create a smooth surface if desired. The wrap 710 can allow the hardening material to form a smooth surface without additional effort from the user The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A repair system, the repair system comprising:
an inanimate object having first and second portions and a broken portion positioned between the first and second portions;
a fabric, wherein the fabric includes one or more fibers; and
a hardening material, wherein the hardening material:
is pre-impregnated in the fabric in an inactivated state;
the amount of pre-impregnated hardening material is sufficient to completely saturate the fabric; and
includes a resin, wherein the resin includes a two part epoxy;
wherein the pre-impregnated fabric is wrapped around the first and second portions of the inanimate object in direct contact with the inanimate object; and
wherein curing the hardening material forms a shell about the first and second portions of the inanimate object.

2. A repair system, the repair system comprising:
an inanimate object having first and second portions and a broken portion positioned between the first and second portions;
a fabric, wherein the fabric includes one or more fibers; and
a hardening material, wherein the hardening material:
is pre-impregnated in the fabric in an inactivated state; and
the amount of pre-impregnated hardening material is sufficient to completely saturate the fabric;
wherein the pre-impregnated fabric is wrapped around the first and second portions of the inanimate object in direct contact with the inanimate object; and
wherein curing the hardening material forms a shell about the first and second portions of the inanimate object, wherein the shell has high impact strength.

* * * * *